(12) United States Patent
Kim et al.

(10) Patent No.: US 6,233,371 B1
(45) Date of Patent: May 15, 2001

(54) OPTICAL FIBER POLARIZATION CONTROLLER

(75) Inventors: Byoung Yoon Kim; Yeon Wan Koh; Young Kie Kim; Young Bae Yeo, all of Taejon (KR)

(73) Assignee: Donam Systems Inc. (KR)

( * ) Notice: Subject to any disclaimer, the term of this patent is extended or adjusted under 35 U.S.C. 154(b) by 0 days.

(21) Appl. No.: 09/214,961

(22) PCT Filed: May 19, 1998

(86) PCT No.: PCT/KR98/00124

§ 371 Date: Jan. 15, 1999

§ 102(e) Date: Jan. 15, 1999

(87) PCT Pub. No.: WO98/53352

PCT Pub. Date: Nov. 26, 1998

(30) Foreign Application Priority Data

May 22, 1997 (KR) .................................................. 97-20056

(51) Int. Cl.[7] .................................................. G02B 6/00
(52) U.S. Cl. .............................. 385/11; 372/105; 372/106
(58) Field of Search .............................. 385/11; 372/105, 372/106

(56) References Cited

U.S. PATENT DOCUMENTS

| | | | |
|---|---|---|---|
| 4,341,442 | * 7/1982 | Johnson | 385/11 |
| 4,603,941 | 8/1986 | Fujii et al. | 350/96 |
| 4,606,605 | * 8/1986 | Ashkin | 385/15 |
| 5,457,756 | 10/1995 | Hartl et al. | 385/11 |
| 5,561,726 | * 10/1996 | Yao | 385/11 |
| 5,761,359 | * 6/1998 | Chudoba | 385/78 |

FOREIGN PATENT DOCUMENTS

| | | |
|---|---|---|
| 0 386 790 A2 | 9/1990 | (EP) . |
| 58-046310A | 3/1983 | (JP) . |

OTHER PUBLICATIONS

LeFevre, H.C., Single–Mode Fibre Fractional Wave Devices and Polarisation Controllers, *Electronics Letters*, vol. 16, No. 20, Sep. 25, 1980.

B.Saleh, M.Teich, Fundamentals of Photonics, Wiley, p. 287, Jan. 1991.*

R. Ulrich and M. Johnson, "Single–mode fiber optical polarization rotator", Applied Optics, 18(11), pp. 1857–1861, Jun. 1979.*

M. Johnson, "Single mode fiber birefringent filters", Optics Letters, 5(4), pp. 142–144, Apr. 1980.*

* cited by examiner

Primary Examiner—Cassandra Spyrou
Assistant Examiner—Leo Boutsikaris
(74) *Attorney, Agent, or Firm*—Marger Johnson & McCollom, P.C.

(57) ABSTRACT

An optical fiber polarization controller which has compact size by employing wave plates made of short sections of a first optical fiber having inherent birefringence such as a polarization maintaining optical fiber. In the control of the polarization state of input light, a second optical fiber, for example a single mode fiber, connected to the first optical fiber is twisted using fixing knobs, thereby rotating the birefringence axis of the first optical fiber with respect to the second optical fiber.

11 Claims, 3 Drawing Sheets

OPTICAL FIBER POLARIZATION CONTROLLER

TECHNICAL FIELD

The present invention relates to an optical fiber polarization manipulating apparatus, more particularly to an optical fiber polarization controller which is very compact in size by using short pieces of birefringent fibers as waveplates.

BACKGROUND ART

Light wave is an electromagnetic wave consisting of the electric and magnetic fields. As it propagates, the electric and magnetic fields oscillate on a transverse plane normal to the propagation direction with a specific oscillation pattern. In general, the polarization is a field which is parallel to the electric field vector E. Therefore, the state of polarization is referred to the oscillation pattern of the electric field on the transverse plane. The state of polarization falls into three categories in terms of the direction and phase of two mutually-orthogonal components of the electric field vectors E. The categories are linear, circular, and elliptical polarization, respectively.

The state of polarization in changed when light propagates through a birefringence medium which has different refractive-indices between two orthogonal eigen axes. The amount of birefringence, or the index difference, is the characteristics of the material itself, however it is affected by external perturbations such as stress, strain and temperature. Silica material is inherently birefringence-free because of its amorphous nature. However, optical fibers that are made of silica tend to exhibit non-negligible birefringence owing to the internal stress as well as non circular-symmetric geometry. Additional birefringence can be also induced by external lateral stress or bending. The change of such birefringence by external perturbations which is often non-deterministic can cause severe problems in fiber-optic applications such as optical communications and sensors. The effects include polarization-induced signal fading or degradation due to the change of polarization state. It is therefore very important in fiber-optic applications to maintain or control the polarization state of light. A polarization controller is an apparatus used to convert an input polarization state to an arbitrary output polarization state and, therefore, a key element in lab experiments, fiber-optic sensors, optical communications, and especially for a system which uses highly polarization dependent optical devices. For example, high-speed optical system employs lithium niobate($LiNbO_3$) as an external modulator to reduce wavelength chirping that comes in at directly modulated light source. In this case, due to the high-polarization dependence of the modulator, matching the polarization state to the birefringence axis of the modulator is essential to get the best performance. In matching the polarization state between a laser diode("LD") and the external modulator, polarization maintaining("PM") fiber is generally used to connect the LD to the external modulator. However, this requires complex process of aligning polarization axis of fiber to those of the LD and the external modulator.

The principle of the polarization controller is that desired polarization state is obtained by using appropriate phase retarders which can transform a state of polarization("SOP") to another SOP. Two quarter-wave plates can be used for the phase retarders.

FIG. 1 illustrates the change of SOP on Poincare Sphere which is generally accepted way to describe the SOP. The convention is that a linear polarization state can be represented by a point "c" located on the equator, and circular polarization by a point "d" located on the pole of the Poincare sphere. A point on the sphere corresponds to a SOP. Since two orthogonal axes of a coordinates can describe any point on the sphere, a point on the sphere can be moved to another point by rotating the two orthogonal axes of the coordinate. This means that any SOP of light can be transformed to any other SOP by means of rotating the axes. It is well-known that two quarter-wave plates that are used in a polarization controller, for example bent fiber loops for making phase retardation by inducing birefringence therein, can perform the above described two rotating axes.

When two quarter-wave plates are used for a polarization controller, the respective azimuthal and polar angles of a point on the sphere can be rotated by rotating two axes of the sphere, namely, the optical axes of two quarter-wave plates. Therefore, input SOP "a" can be transformed to a desired output SOP "b" as shown in FIG. 1.

FIG. 2 schematically shows a conventional optical fiber polarization controller according to a prior art.

The polarization controller shown in FIG. 2 is disclosed by H. C. LeFevre, in Electronics Letters, Vol. 16, No. 20, September 1980. Referring to FIG. 2, a length of single mode optical fiber 1 is wound on a bobbin 10 with a predetermined diameter. The bending gives birefringence to the optical fiber by bending-induced stress, which makes two birefringence axes, parallel and perpendicular to bobbin 10. At an appropriate diameter, the induced birefringence makes a quarter-wave plate for a given optical wavelength. Since the birefringence principal axis rotates as the rotation of bobbin 10 to R-direction, the SOP of input light $P_{in}$ can be controlled to a desired SOP polarization state in output light $P_{out}$. With this bobbin, the polarization controller can not avoid comparably large volume, making it hard to be mounted on a common circuit board.

FIG. 3 is a cross sectional view showing the application of other polarization controller of prior arts. This kind of polarization controller can give small size compared with the above described prior art. Referring to FIG. 3, the polarization controller has a screw 32 which can contact the outer surface of optical fiber 31. In the polarization controller of FIG. 3, the polarization state is controlled by the birefringence, induced from the mechanical stress which is applied to the optical fiber by screw 32. In principle, there should be means for acting as two orthogonal rotating axes to control the polarization state as described in FIG. 1. The means to achieve this action is the screw that presses the optical fiber from different directions with different force, which corresponds to the two orthogonal axes of the above polarization controller. For example, as shown in FIG. 3, after the stress applied in X-Y direction is released, other stress is applied in X'-Y' direction. This single controlling means may cause difficulty in controlling the polarization. The problem with such polarization controller is that the reliability of the polarization controller is significantly affected by the squeezing of the fiber, because the squeezing can damage the jacket of the fiber and fiber itself. Moreover, the mechanically squeezed jacket may not recover its original form so that the stress still remains in the fiber, which results in uncontrollable situation.

DISCLOSURE OF INVENTION

It is therefore an object of the present invention to provide an optical fiber polarization controller with meaningfully small size applicable to an electric circuit board.

It is other object of the present invention to provide an optical fiber polarization controller having improved durability without squeezing the optical fiber.

It is another object of the present invention to provide an inexpensive optical fiber polarization controller without using PM optical fiber for entire fiber strand of the controller.

In order to accomplish the aforementioned object, the present invention provides an optical fiber polarization controller, comprising: at least one part of a first optical fiber having birefringence, a part of a second single-mode optical fiber having at least one connected point with the first optical fiber to the end of the part to form a strand of optical fibers for transmitting light along the strand; and a twisting means for controlling angle of the birefringence axes of the first fiber.

The connected points can be formed by fusion splicing and/or physical contact. The optical fiber polarization controller may be configured to have more than two parts of the first optical fiber.

Each of the parts may have a length adjusted to perform a quarter wave plate according to the difference between its birefringence indices.

According to other aspect of the invention, the optical fiber polarization controller comprises: two slices of a first optical fiber having birefringence; two parts of a second single-mode optical fiber, each part having a connected portion to the end of the slice to transmit light with the slices; a pair of ferrules for inserting the connected portions and the slices therein, and for aligning two parts of the first single-mode optical fiber by contacting the facing ends of two slices; a sleeve for inserting the pair of ferrules to fix it therein; and a rotating means for ferrules.

The connected portions may also be formed by fusion splicing or physical contact. Each of the slices can have a length adjusted to perform a quarter-wave plate according to the difference between its birefringence indices.

The structure of the connected portions is not limited to the aforementioned structure, and any structure can be used if low connection losses are guaranteed.

BEST MODE FOR CARRYING OUT THE INVENTION

Hereinafter, preferred embodiments of the present invention will be described referring to the accompanying drawings.

Figure 1:
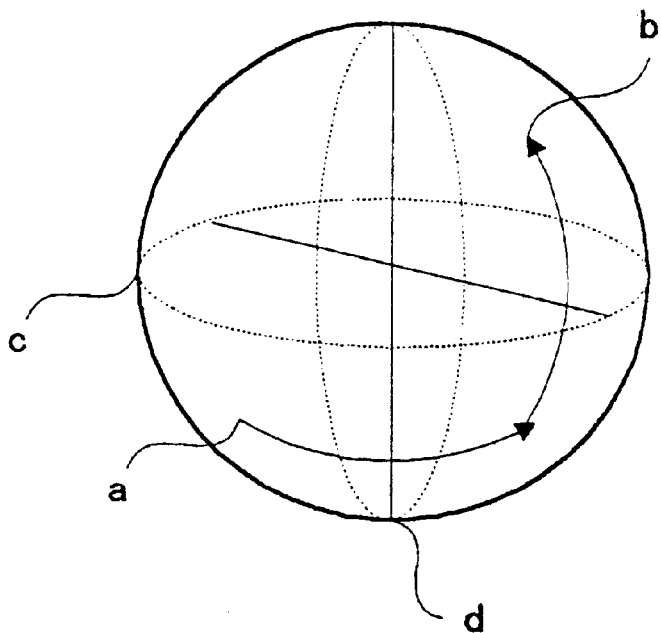
FIG. 1 illustrates the change of polarization state on Poincare Sphere which is frequently used to show the polarization state of light.
Figure 2:
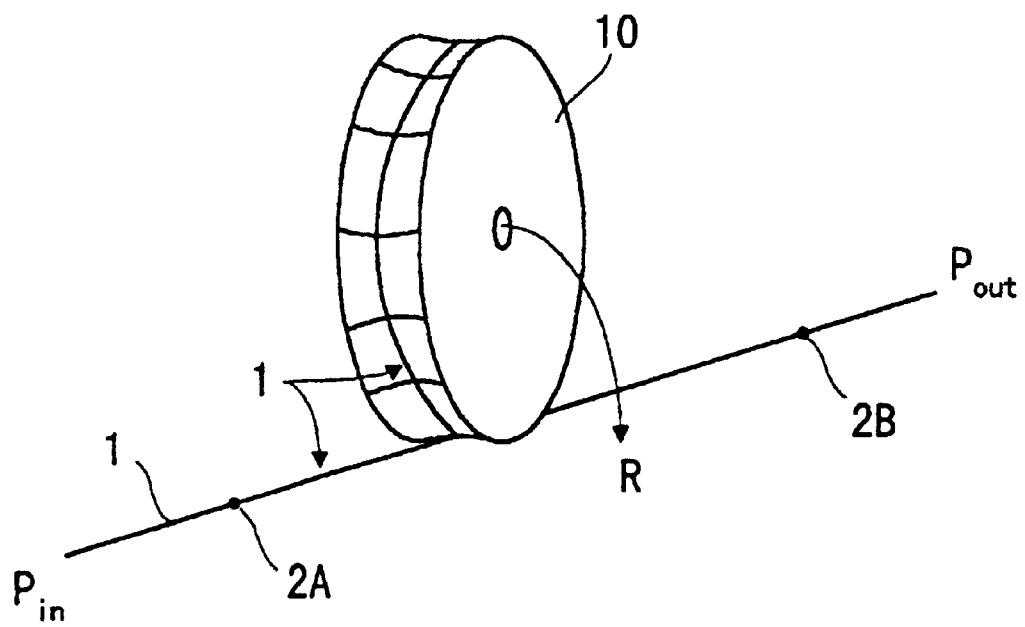
FIG. 2 schematically shows a conventional optical fiber polarization controller according to a prior art.
Figure 3:
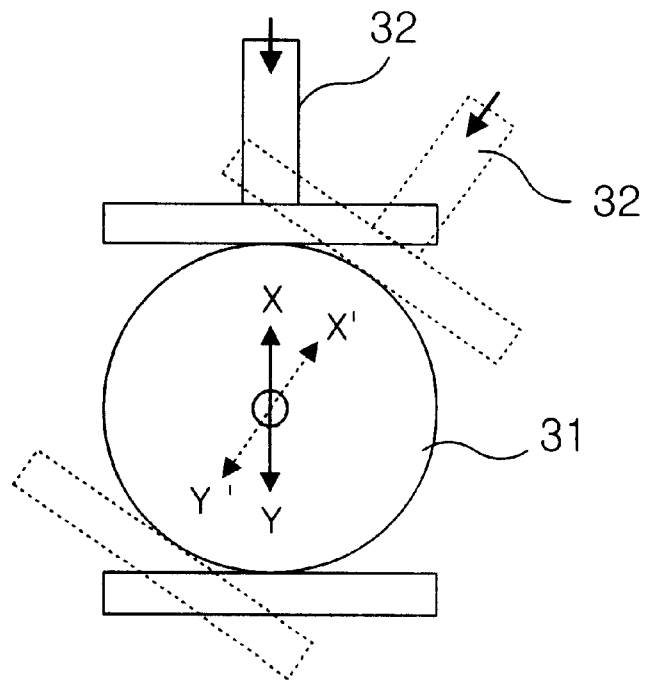
FIG. 3 is a cross sectional view showing the application of other polarization controller of prior arts.
Figure 4:
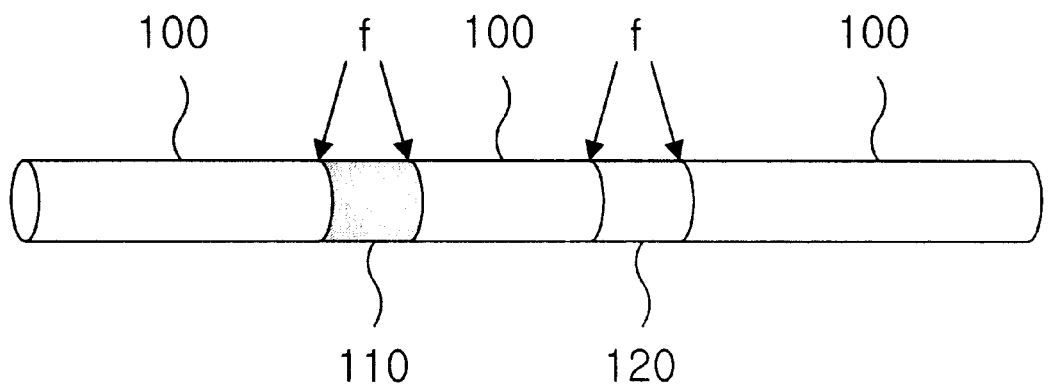
FIG. 4 is a partially enlarged view showing only optical fibers in the optical fiber polarization controller according to an embodiment of the invention.

FIG. 4 is a partially enlarged view showing only optical fibers in the in-line optical fiber polarization controller according to an embodiment of the invention.

Referring to FIG. 4, the end portions "f" of slices 110 and 120 are optically connected to the second optical fiber 100 to form a strand of optical fibers capable of transmitting light. The slices 110 and 120 of the first optical fiber are birefringent, that is, have two birefringent axes of different refractive indices from each other. A conventional single mode fiber with low birefringence can be used as the second optical fiber 100. The connection between the second optical fibers 100 and slices 110 and 120 can be made by fusion splicing. Other connecting method includes mechanical splicing or physical contact aided by a ferrule. Slices 110 and 120 are short sections of a birefringent optical fiber with proper length to perform the function of wave plates. Typically, the length can be adjusted to act as a quarter-wave plate or half-wave plate. For example, when the index difference($\Delta n$) between the birefringence axes of the slices is an order of $10^{-4}$ as in this embodiment, the length of the slices 110 and 120 would be only a few mm's for an optical wavelength of about 1.5 micrometer. When an optical wave with a certain polarization state transmits through single or multiple birefringent slices, the output polarization state is determined by the settings of the birefringence axes of the slices with respect to each other and also to the input polarization state. Therefore, by rotating the birefringence axes, any polarization state in the input light can be transformed to any polarization state in the output. To do this, one can rotate the slice with respect to the birefringent slices spliced to them. If the slices are mechanically connected to the lead fiber by using a ferrule, the slices can be rotated with respect to the lead fibers to change the orientation of the birefringence axes. Other means includes lateral stress applied to the slices to change the magnitude of the birefringence.

Figure 5:
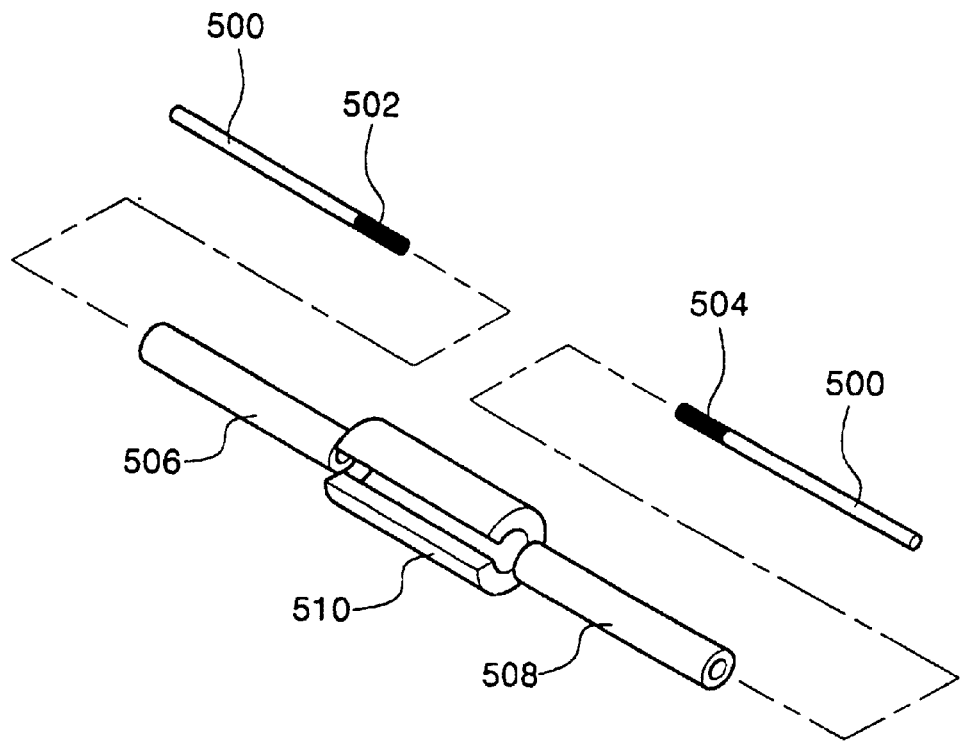
FIG. 5 shows other embodiment of the invention with a more compact size than the one in FIG. 4.

FIG. 5 shows other embodiment of the invention with a more compact size than the one in FIG. 4. The piece of the second optical fiber between the optical fiber slices 110 and 120 shown in FIG. 4 is not necessary. In this embodiment, two slices of the birefringent first optical fiber, 502 and 504, are connected to pieces 500 of the second single mode optical fiber by fusion splicing. Then, the yet free ends of the slices 502 and 504 are connected to each other by a mechanical splicing or physical contact. For ease of this splicing process, conventional physical contact based on ferrules and sleeves can be used. Specifically, the slices 502 and 504 are inserted into ferrules 506 and 508, respectively. The ferrules 506 and 508 are aligned to each other for minimum optical loss with help of a cylindrical sleeve 510. The material for ferrules 506 and 508 was zirconia in this particular embodiment, however could be stainless steel, quartz, alumina, or the like. The first optical fiber slices 502 and 504 are physically contacted without using fusion splicing. The typical optical loss of the physical contact could be less than 0.2 dB.

Figure 6:
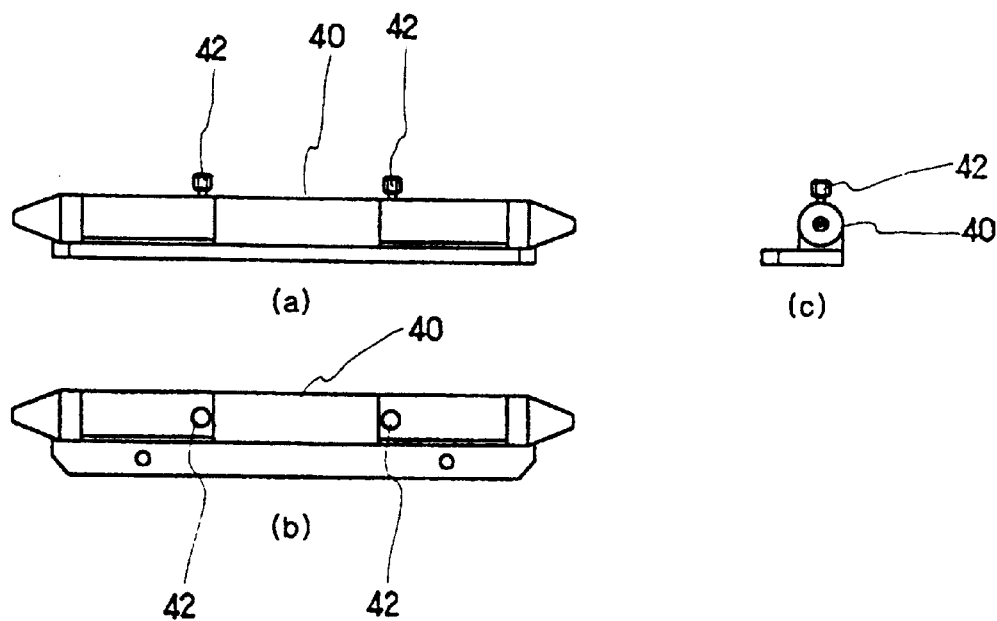
FIG. 6(a) to FIG. 6(c) schematically show a fixing apparatus to mount the optical fiber part of the optical fiber polarization controller on a electric circuit board.

FIG. 6(a), 6(b) and 6(c) schematically show a fixing apparatus from different angles which is used to mount the optical fiber elements of the optical fiber polarization controller. FIG. 6(a) is a side view, FIG. 6(b) is a plane view and FIG. 6(c) is a front view of the assembled apparatus. A strand of optical fiber composed of the first optical fiber slices 110, 120 and the second optical fiber 100 of FIG. 4 passes lengthwise through a hollow cylindrical fixing apparatus 40. Knobs 42 are used to fix the position of the cylindrical fixing apparatus 40. Also, the knobs help the process of rotating and fixing at a position of the cylindrical fixing apparatus. The above described fixing apparatus can be miniaturized to a size small enough to be mounted on a electric circuit board.

The performance of the optical fiber polarization controller manufactured as above was analyzed. Total insertion loss of the polarization controller was less than 0.5 dB, and the back reflection was far below −60 dB. Arbitrary input polarization state could be transformed to any output polarization state with an excellent polarization extinction of greater than −45 dB. Moreover, since the second optical fiber was a conventional communication grade single-mode optical fiber, the polarization controller is perfectly compatible with other fiber-optic components and instruments through fusion splicing or conventional connectors. Unlike the prior arts that was comprised of an apparatus for bending optical fibers to induce birefringence, the polarization controller according to the invention is much more compact in size. Further, the polarization controller according to the invention is more durable than another prior art in which an optical fiber has to be squeezed laterally with frequent changes of the magnitude and direction of the squeezing. Moreover, the polarization controller according to the invention provides inexpensive optical communication systems since entire strand of the optical fibers is composed of common communication grade optical fibers instead of polarization maintaining optical fibers.

What is claimed is:

1. An apparatus comprising:
    a sections of a first optical fiber with inherent birefringence, the axes of the inherent birefringence having different refractive indices;
    a second optical fiber connected to said section of the first optical fiber to transmit light from the second optical fiber to the first optical fiber, or from the first optical fiber to the second optical fiber; and
    twisting means for rotating the birefringence axes of said section of the first optical fiber with respect to said second optical fiber, wherein twisting means applies only twist to said second optical fiber without giving any squeezing on said second optical fiber;
    wherein said section of the first optical fiber is sized to provide phase delay equal to single or a multiple of quarter pi($\pi$) radian between two eigen polarization states defined by the birefringence axes.

2. The apparatus of claim 1, wherein the first optical fiber comprises a polarization maintaining optical fiber having a polarizing maintaining property resulted from its shape.

3. The apparatus of claim 1, wherein the connection between said section of the first optical fiber and the second optical fiber is made by fusion splicing or physical contact.

4. An apparatus comprising:
    a plurality of sections of a first optical fiber with inherent birefringence, the axes of the inherent birefringence having different refractive indices;
    a plurality of sections of a second optical fiber connected to said sections of the first optical fiber to transmit light from the second optical fiber to the first optical fiber, or from the first optical fiber to the second optical fiber; and
    twisting means for rotating the birefringence axes of said sections of the first optical fiber with respect to adjacent sections of the second optical fiber, wherein twisting means applies only twist to said sections of second optical fiber without giving any squeezing on said sections of second optical fiber;
    wherein said sections of the first optical fiber are sized to provide phase delay equal to single or a multiple of quarter pi($\pi$) radian between two eigen polarization states defined by the birefringence axes.

5. The apparatus of claim 4, wherein the first optical fiber comprises a polarization maintaining optical fiber having a polarization maintaining property resulted from its shape.

6. The apparatus of claim 4, wherein the connection between said sections of the first optical fiber and the second optical fiber is made by fusion splicing or physical contact.

7. An apparatus comprising:
    a plurality of sections of a first optical fiber with inherent birefringence, the axes of the inherent birefringence having different refractive indices;
    a plurality of sections of a second optical fiber;
    wherein two or more of said sections of the first optical fiber are connected to each other and the remainder 3 of said sections of the first optical fiber are connected to said sections of the second optical fiber;
    and twisting means for rotating the birefringence axes of said sections of the first optical fiber with respect to adjacent sections of the second optical fiber, wherein twisting means applies only twist to said sections of second optical fiber without giving any squeezing on said sections of second optical fiber;
    wherein said sections of the first optical fiber are sized to provide phase delay equal to single or a multiple of quarter pi($\pi$) radian between two eigen polarization states defined by the birefringence axes.

8. The apparatus of claim 7, wherein the first optical fiber comprises a polarization maintaining optical fiber having a polarization maintaining property resulted from its shape.

9. The apparatus of claim 7, wherein the connection between said sections of the first optical fiber and the second optical fiber is made by fusion splicing or physical contact.

10. The apparatus of claim 7, wherein the connection between said sections of the first optical fiber is made by physical contact.

11. The apparatus of claim 10, wherein the physical contact is aided by ferrules and sleeves.

* * * * *